US012218422B2

(12) United States Patent
Terada et al.

(10) Patent No.: US 12,218,422 B2
(45) Date of Patent: Feb. 4, 2025

(54) ANTENNA DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Shuhei Terada, Yokkaichi (JP); Norichika Oomi, Yokkaichi (JP); Kosuke Sone, Yokkaichi (JP); Yasuyuki Yamamoto, Yokkaichi (JP); Ai Takehisa, Yokkaichi (JP); Ichiro Kuwayama, Osaka (JP); Suguru Yamagishi, Osaka (JP); Yutaro Miki, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 137 days.

(21) Appl. No.: 18/246,112

(22) PCT Filed: Aug. 3, 2021

(86) PCT No.: PCT/JP2021/028723

§ 371 (c)(1),
(2) Date: Mar. 21, 2023

(87) PCT Pub. No.: WO2022/064862

PCT Pub. Date: Mar. 31, 2022

(65) Prior Publication Data

US 2023/0369770 A1 Nov. 16, 2023

(30) Foreign Application Priority Data

Sep. 25, 2020 (JP) ................................ 2020-160736

(51) Int. Cl.
*H01Q 13/08* (2006.01)
*H01Q 1/38* (2006.01)
*H01Q 1/50* (2006.01)

(52) U.S. Cl.
CPC .............. *H01Q 13/08* (2013.01); *H01Q 1/38* (2013.01); *H01Q 1/50* (2013.01)

(58) Field of Classification Search
CPC ...... H01Q 1/243; H01Q 1/32; H01Q 1/38–48; H01Q 1/50–52; H01Q 9/0407; H01Q 13/08
See application file for complete search history.

(56) References Cited

U.S. PATENT DOCUMENTS 7,009,563 B2 * 3/2006 Mori ..................... H01Q 9/045 343/702
11,367,955 B2 * 6/2022 Takaki .................. H01Q 5/342
(Continued)

FOREIGN PATENT DOCUMENTS

JP 2-256305 10/1990
JP 2021192506 A 12/2021

OTHER PUBLICATIONS

Japanese Office Action issued in Application No. 2020-160736 dated Oct. 2, 2023, with English translation, 10 pages.
(Continued)

*Primary Examiner* — Hasan Islam
(74) *Attorney, Agent, or Firm* — Honigman LLP

(57) ABSTRACT

An antenna device includes: a conductive ground conductor plate; a plate-shaped radiating element disposed without being in contact with the ground conductor plate; a feeding line including a conductor and a shield member that surrounds the conductor, the shield member being connected to the ground conductor plate; and a conductive feeding element that includes a facing plate portion that faces the
(Continued)

radiating element with an air layer provided therebetween, and is connected to the conductor.

8 Claims, 5 Drawing Sheets

(56) References Cited

U.S. PATENT DOCUMENTS

| | | | |
|---|---|---|---|
| 2004/0145525 | A1 | 7/2004 | Annabi et al. |
| 2021/0384619 | A1 | 12/2021 | Tezuka |

OTHER PUBLICATIONS

International Search Report, Application No. PCT/JP2021/028723, mailed Sep. 21, 2021. ISA/Japan Patent Office.

Manabu Yamamoto, "The Forest of Knowledge Group 4, vol. 2, Chapter 5—, The Institute of Electronics, Information and Communication Engineers" pp. 8/(15), Figs. 5 and 4(a), [online], Mar. 2010, The Institute of Electronics, Information and Communication Engineers, [searched on Jul. 6, 2020], Internet <http://www.ieice-hbkb.org/>.

* cited by examiner

ANTENNA DEVICE

CROSS-REFERENCE TO RELATED APPLICATIONS

This application is the U.S. national stage of PCT/JP2021/028723 filed on Aug. 3, 2021, which claims priority of Japanese Patent Application No. JP 2020-160736 filed on Sep. 25, 2020, the contents of which are incorporated herein.

TECHNICAL FIELD

The present disclosure relates to an antenna device.

BACKGROUND

Manabu Yamamoto, "The Forest of Knowledge 4, Vol. 2, Chapter 5-, The Institute of Electronics, Information and Communication Engineers" pp. 8/(15), FIGS. 5 and 4(a), [online], March 2010, The Institute of Electronics, Information and Communication Engineers, [searched on Jul. 6, 2020], Internet http://www.ieice-hbkb.org/discloses an antenna device including a ground conductor plate, a radiating element installed to be parallel to and to be separated by a predetermined distance from the ground conductor plate, and a coaxial line electrically connecting the radiating element and the ground conductor plate.

In an antenna device in which the radiating element and the ground conductor plate are directly connected to each other through the coaxial line, it is difficult to adjust the impedance.

SUMMARY

The present disclosure is made in view of the above, and an object of the present disclosure is to provide an antenna device capable of adjusting impedance.

An antenna device of the present disclosure includes: a conductive ground conductor plate; a plate-shaped radiating element disposed without being in contact with the ground conductor plate; a feeding line including a conductor and a shield member that surrounds the conductor, the shield member being connected to the ground conductor plate; and a conductive feeding element that includes a facing plate portion that faces the radiating element with a dielectric layer provided therebetween, and is connected to the conductor.

Advantageous Effects of Disclosure

According to the present disclosure, impedance can be adjusted.

BRIEF DESCRIPTION OF PREFERRED EMBODIMENTS

First of all, embodiments of the present disclosure are listed and described.

First Aspect

In accordance with a first aspect, an antenna device of the present disclosure includes:

- a conductive ground conductor plate; a plate-shaped radiating element disposed without being in contact with the ground conductor plate; a feeding line including a conductor and a shield member that surrounds the conductor, the shield member being connected to the ground conductor plate; and a conductive feeding element that includes a facing plate portion that faces the radiating element with a dielectric layer provided therebetween, and is connected to the conductor. According to the configuration of the present disclosure, since the dielectric layer is interposed between the radiating element and the facing plate portion of the feeding element, power is supplied from the conductor to the radiating element through capacitive coupling. The impedance can be adjusted by changing the size of the feeding element.

Second Aspect

In a second aspect, the feeding line is attached penetrating the ground conductor plate. With this configuration, as compared with a case where the feeding line is contained between the ground conductor plate and the radiating element, a degree of design freedom in setting the routing path of the feeding line is high.

Third Aspect

In a third aspect, a positioning member with which the radiating element and the facing plate portion are positioned is further provided. With this configuration, the radiating element and the facing plate portion can face each other with stable distance and orientation, so that the optimum antenna characteristics can be maintained.

Fourth Aspect

In a fourth aspect, the positioning member and the feeding line are fixed to the ground conductor plate in (3). With this configuration, the feeding element and the conductor can be stably connected to each other.

Fifth Aspect

In a fifth aspect, a containing recess portion that contains the feeding element is formed in the positioning member in (3) or (4). With this configuration, the feeding element is contained in the containing recess portion, and thereby protected from interference by a foreign matter.

Sixth Aspect

In a sixth aspect, the facing plate portion has a circular shape, and the facing plate portion is coaxially attached to the conductor. The shape of the facing plate portion is not limited to a perfect circle, and may be a substantially circular shape. With this configuration, even if the facing plate portion is displaced relative to the conductor in the circumferential direction when the feeding element and the conductor are assembled, antenna characteristics will not be affected.

First Embodiment

A first embodiment of an antenna device of the present disclosure is described with reference to FIG. 1 to FIG. 4.

Figure 4:
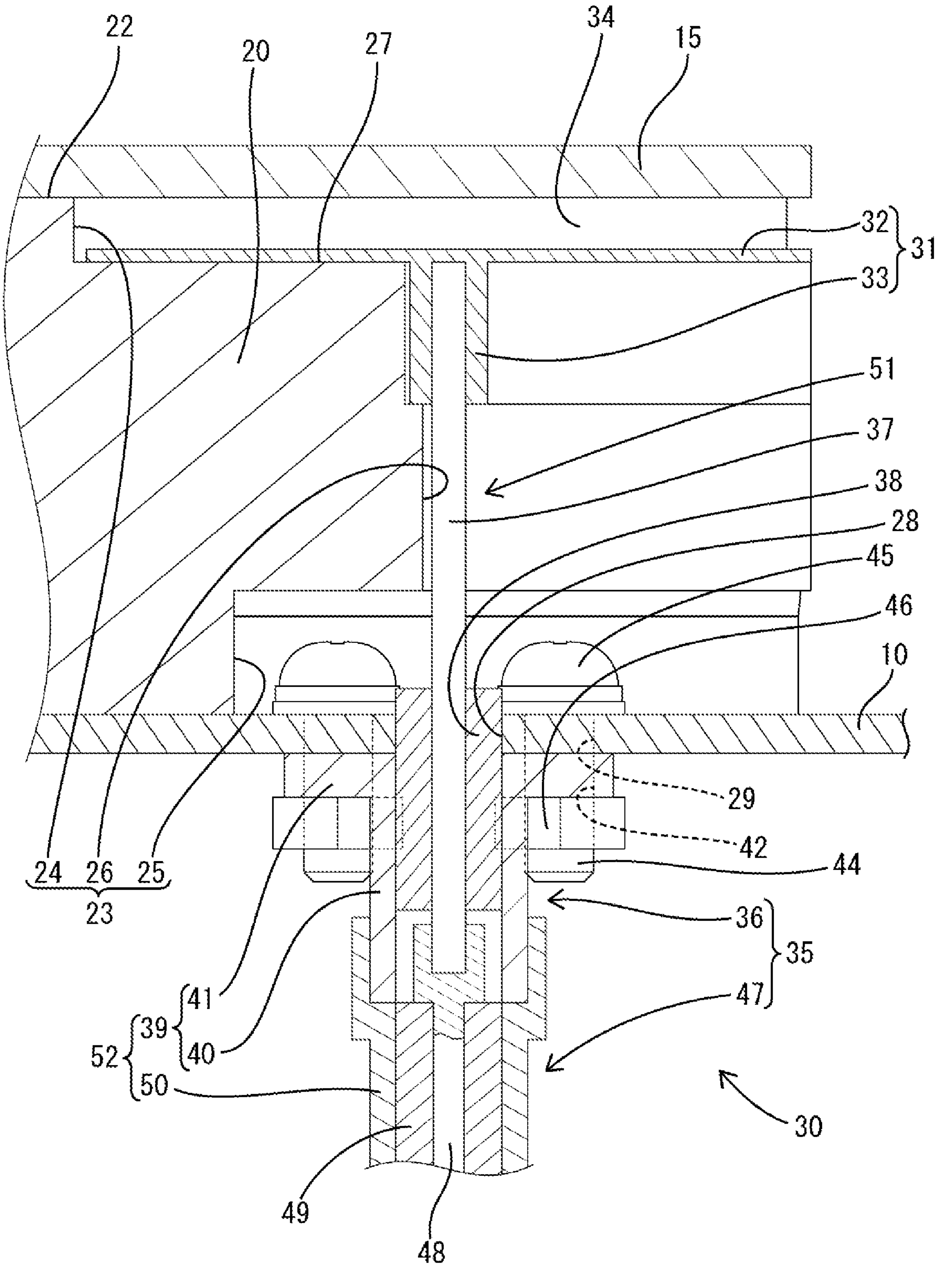
FIG. 4 is a partially enlarged cross-sectional view of the antenna device.

The present disclosure is not limited to the examples, and is expressed by the claims, while including all modifications within the meaning and scope equivalent to the claims. In the present first embodiment, regarding the front and back direction, the lower right side in FIG. 1 and FIG. 2, and the right side in FIG. 4 are defined as the front side. Regarding the upper and lower direction, the upper side and the lower side are simply defined as what they are in FIG. 1 to FIG. 4.

Figure 1:
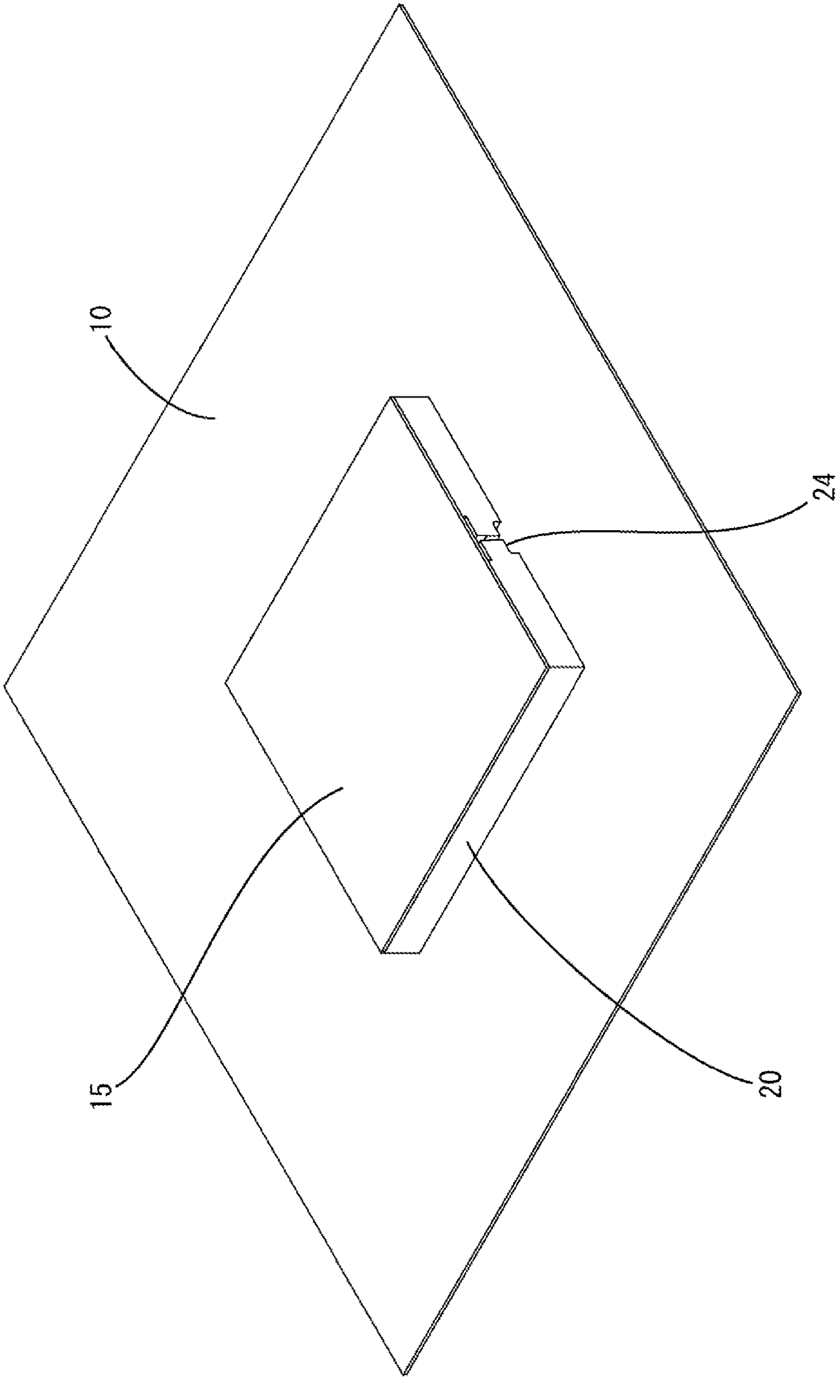
FIG. 1 is a perspective view of an antenna device of a first embodiment.
Figure 2:
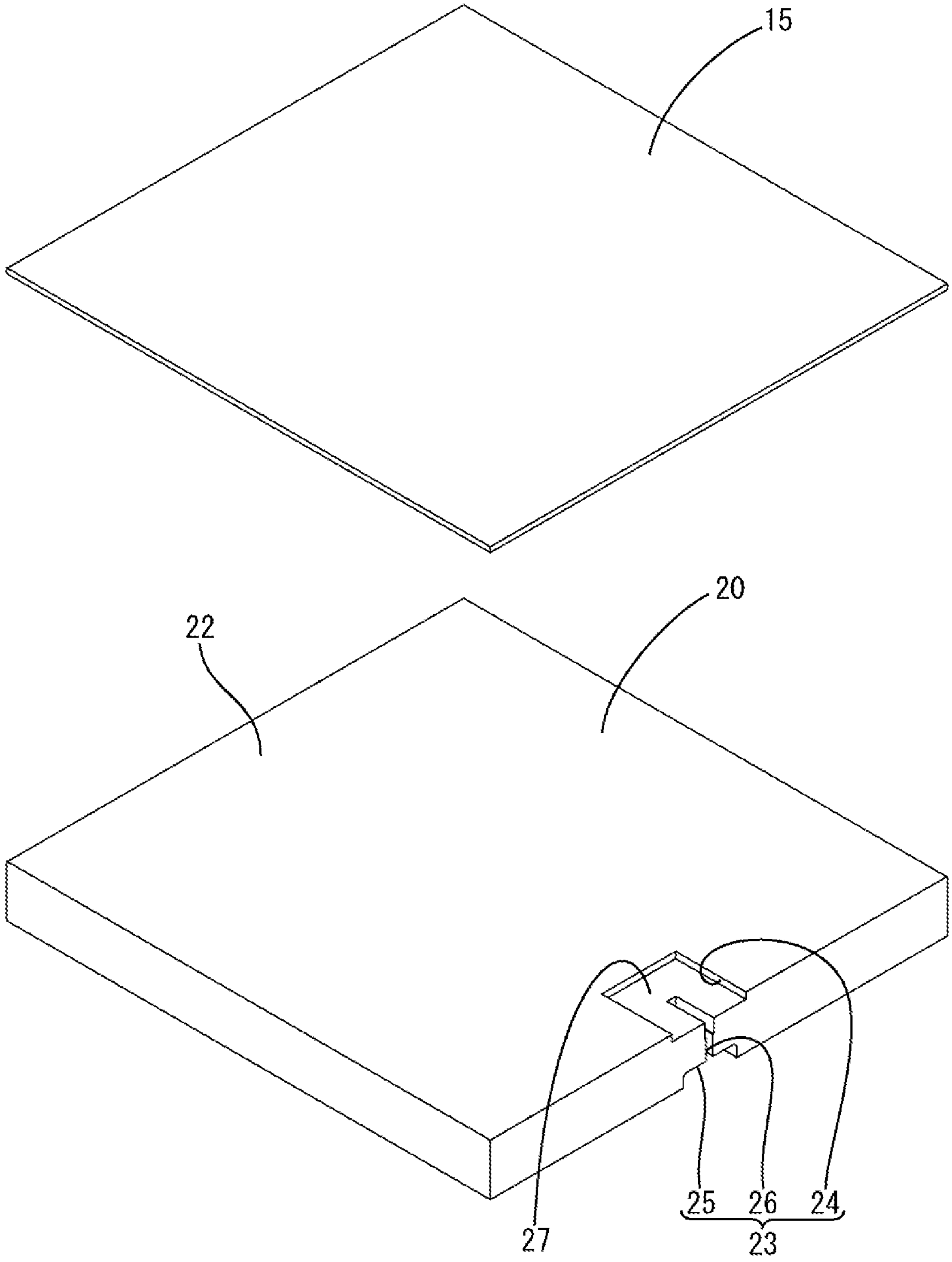
FIG. 2 is a perspective view illustrating a state in which a positioning member and a radiating element are separated from each other.
Figure 3:
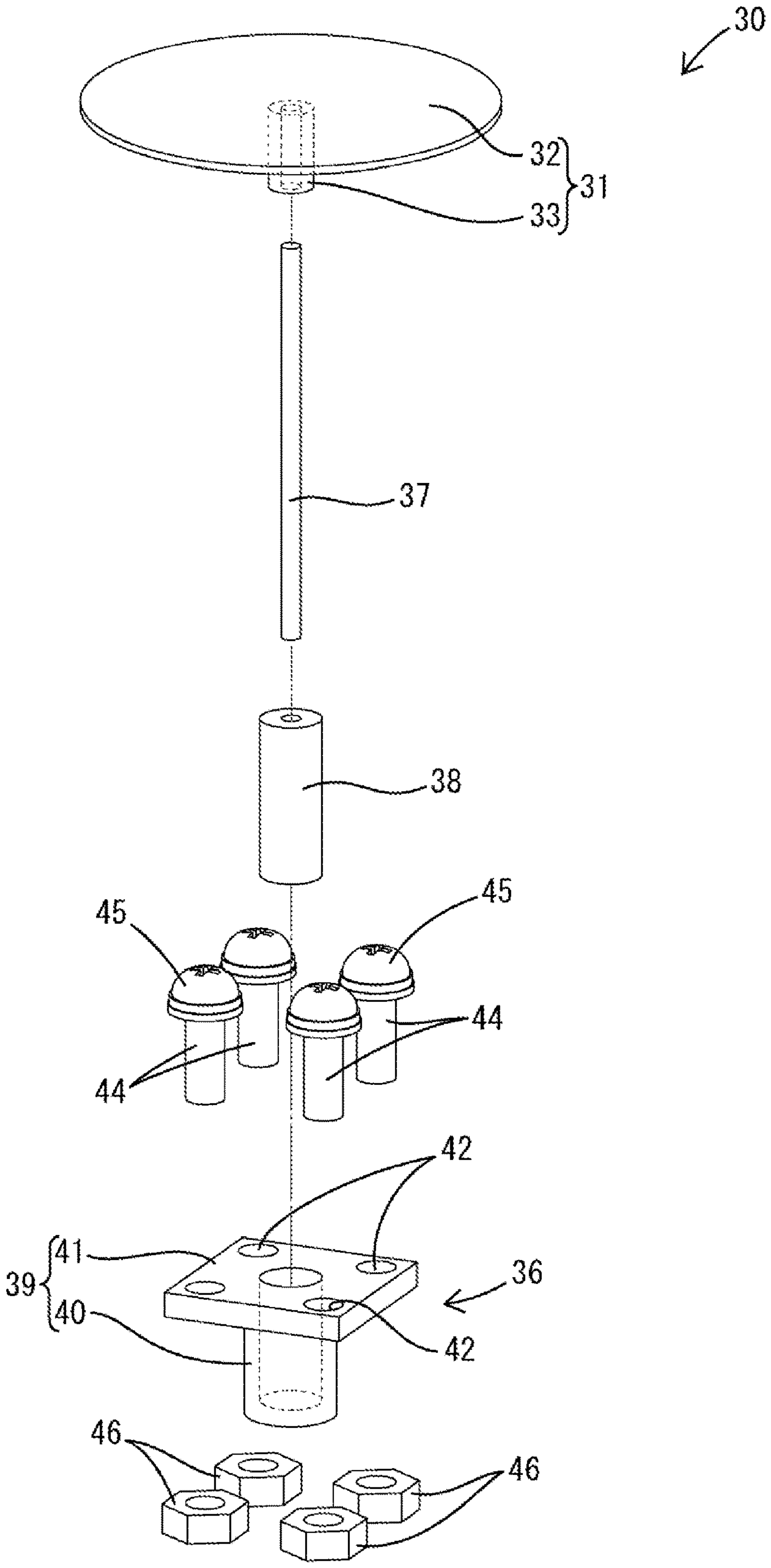
FIG. 3 is an exploded perspective view of a feeding unit.

The antenna device is a microstrip antenna configured by assembling a ground conductor plate 10, a radiating element 15, a positioning member 20, and a feeding unit 30. The ground conductor plate 10 is a plate-like member that is made of metal or the like and forms a roof of an automobile, and is conductive. A region of the ground conductor plate 10 forming the antenna device has a horizontal flat plate shape. In FIG. 1, the ground conductor plate 10 is illustrated in a square shape for the sake of convenience. However, the shape of the ground conductor plate 10 may be circular, since the roof of the automobile as a whole functions as the ground conductor plate 10.

The radiating element 15 is a square plate-like member made of a conductive material such as metal. The radiating element 15 is horizontally disposed above the ground conductor plate 10 with the positioning member 20 provided therebetween. Due to the positioning member 20, the radiating element 15 is disposed parallel to the ground conductor plate 10.

The positioning member 20 is made of an electrically insulating material such as foamable resin, and functions as a dielectric substrate interposed between the ground conductor plate 10 and the radiating element 15. The positioning member 20 has the same square shape as the radiating element 15 in plan view. The length of one side of the positioning member 20 is equal to the length of one side of the radiating element 15. The height of the positioning member 20 is greater than the thickness of the ground conductor plate 10 and the thickness of the radiating element 15.

The positioning member 20 is fixed to the upper surface of the ground conductor plate 10 by welding or the like. The upper surface of the positioning member 20 functions as a first positioning surface 22. The radiating element 15 is fixed to the first positioning surface 22 while being in surface contact therewith. With this laminated structure, the radiating element 15 is positioned with respect to the ground conductor plate 10 in the vertical direction and the horizontal direction.

The positioning member 20 is formed with a part in the circumferential direction recessed to be a containing recess portion 23. The containing recess portion 23 includes a front surface recess portion 24, a back surface recess portion 25, and an outer side surface recess portion 26. The front surface recess portion 24 is a shallow recess formed in part of the first positioning surface 22. The upper surface of the front surface recess portion 24 functions as a second positioning surface 27 parallel to the first positioning surface 22. The front surface recess portion 24 is opened to an outer circumference surface of the positioning member 20.

The back surface recess portion 25 is a shallow recess formed in a lower surface of the positioning member 20, that is, the surface facing to the ground conductor plate 10. The back surface recess portion 25 is formed in a region, in the lower surface of the positioning member 20, at the same position as the front surface recess portion 24 in the circumferential direction. The back surface recess portion 25 is opened to an outer circumference surface of the positioning member 20. In a portion of the ground conductor plate 10 facing the back surface recess portion 25, a fitting hole 28 that is a circular through hole, and four fastening holes 29 arranged to surround the fitting hole 28 are formed.

In the outer circumference surface of the positioning member 20, the outer side surface recess portion 26 is open elongatedly in the vertical direction orthogonal to the radiating element 15. The outer side surface recess portion 26 extends in a slit shape from the outer circumference surface of the positioning member 20 toward a center portion of the positioning member 20 in plan view. The width of the outer side surface recess portion 26 in the horizontal direction is sufficiently smaller than the width of the front surface recess portion 24 and the back surface recess portion 25 in the horizontal direction. The outer side surface recess portion 26 is disposed at the same position as the center portions of the front surface recess portion 24 and the back surface recess portion 25 in the circumferential direction. An upper end of the outer side surface recess portion 26 communicates with the front surface recess portion 24, and a lower end thereof communicates with the back surface recess portion 25.

As illustrated in FIG. 4, the feeding unit 30 includes a feeding element 31, a feeding line 35, bolts 44, and nuts 46. The feeding element 31 is a single part that is made of a conductive material such as metal, and includes a facing plate portion 32 and a connection portion 33. The facing plate portion 32 has a circular plate shape. The outer diameter of facing plate portion 32 is sufficiently smaller than the length of one side of radiating element 15. As a specific example, the length of one side of the radiating element 15 may be 215 mm, and the diameter of the facing plate portion 32 may be 45 mm.

The connection portion 33 has a tubular shape with the axis extending in the vertical direction. The outer diameter of the connection portion 33 is sufficiently smaller than the outer diameter of the facing plate portion 32. The connection portion 33 protrudes downward from the lower surface of the facing plate portion 32, while being concentric with the facing plate portion 32. As illustrated in FIG. 4, the feeding element 31 is attached to the positioning member 20, with the facing plate portion 32 contained in the front surface recess portion 24 and with the connection portion 33 contained in the outer side surface recess portion 26.

The facing plate portion 32 is fixed to the second positioning surface 27 while being in surface contact therewith, by welding, bonding, or the like. When the facing plate portion 32 is fixed to the second positioning surface 27, the feeding element 31 is positioned by the positioning member 20 with respect to the ground conductor plate 10 and the radiating element 15. The upper surface of the facing plate portion 32 is disposed parallel to and to face the lower surface of the radiating element 15, with an air layer 34 (predetermined gap) serving as a dielectric layer provided therebetween. In a specific example, when the length of one side of the radiating element 15 is 215 mm and the diameter of the facing plate portion 32 is 45 mm, the dimension of the air layer 34 in the vertical direction may be set to 2 mm. The dimension of the air layer 34 in the vertical direction is a dimension of the gap between the upper surface of the facing plate portion 32 and the lower surface of the radiating element 15.

As illustrated in FIG. 4, the feeding line 35 includes a connector 36 and a coaxial cable 47 connected to the connector 36. The connector 36 is configured by assembling an inner conductor 37 made of a conductive material such as metal, a dielectric 38 having a tubular shape surrounding the inner conductor 37, and an outer conductor 39 made of a conductive material such as metal. The inner conductor 37 has a thin and long rod shape with the axis extending in the vertical direction. The inner conductor 37 is longer than the dielectric 38, and has an upper end portion protruding upward from the dielectric 38.

The outer conductor 39 is a single part including a tubular portion 40 having a tubular shape with the axis extending in the vertical direction, and a flange portion 41 formed in an upper end portion of the outer circumference of the tubular portion 40. In the tubular portion 40, a lower end portion of the inner conductor 37 and the entirety of the dielectric 38 are concentrically contained. An upper end portion of the dielectric 38 protrudes upward from the upper surface of the outer conductor 39. Four attachment holes 42 are formed in the flange portion 41.

The connector 36 is fixed to the lower surface of the ground conductor plate 10. In a state where the connector 36 is fixed to the ground conductor plate 10, the upper end portion of the dielectric 38 is fitted in the fitting hole 28 from below the ground conductor plate 10, and the flange portion 41 is in conductive contact with the lower surface of the ground conductor plate 10. The bolts 44 are passed through the fastening holes 29 and the attachment holes 42 from the upper side of the ground conductor plate 10. The nuts 46 are screwed and fastened to the bolts 44 on the lower side of the ground conductor plate 10 and the flange portion 41. A head portion 45 of the bolt 44 is contained in the back surface recess portion 25. A portion of the inner conductor 37 protruding upward from the dielectric 38 is contained in the outer side surface recess portion 26. The upper end portion of the inner conductor 37 is fitted into the connection portion 33 of the feeding element 31, and thereby the inner conductor 37 and the feeding element 31 are conductively connected with each other.

The coaxial cable 47 has a known configuration including a conductive core wire 48, an insulating coating 49 surrounding the core wire 48, and a shield layer 50 surrounding the insulating coating 49. A distal end portion of the coaxial cable 47 is connected to the lower end portion of the connector 36, thereby forming the feeding line 35. The feeding line 35 includes a conductor 51 and a shield member 52. The conductor 51 is formed by connecting the core wire 48 and the inner conductor 37. The shield member 52 is formed by connecting the shield layer 50 and the tubular portion 40 of the outer conductor 39. The feeding line 35 is fixed to the ground conductor plate 10 while passing through the fitting hole 28. The conductor 51 is conductively connected to the feeding element 31.

The antenna device of the present first embodiment includes the conductive ground conductor plate 10, the plate-shaped radiating element 15, the feeding line 35, and the feeding element 31. The radiating element 15 is disposed without being in contact with the ground conductor plate 10. The feeding line 35 includes the conductor 51 and the shield member 52 surrounding the conductor 51. The flange portion 41 of the shield member 52 is conductively connected to the ground conductor plate 10. The feeding element 31 is a conductive member, and disposed between the ground conductor plate 10 and the radiating element 15. The feeding element 31 includes the facing plate portion 32. The facing plate portion 32 and the radiating element 15 face each other with a gap therebetween, with the air layer 34 serving as the dielectric layer interposed therebetween. The connection portion 33 to be connected to the conductor 51 is provided on a surface of the facing plate portion 32 facing the ground conductor plate 10. The upper end portion of the inner conductor 37 of the conductor 51 is connected to the connection portion 33.

In the antenna device of the present first embodiment, the air layer 34 (dielectric layer) is formed between the radiating element 15 and the facing plate portion 32 of the feeding element 31. Thus, with the antenna device of the present first embodiment, power can be supplied from the conductor 51 to the radiating element 15 through capacitive coupling. The optimum antenna characteristics can be obtained through impedance adjustment by changing the diameter and the area of the facing plate portion 32 and the distance between the facing plate portion 32 and the radiating element 15 facing each other, that is, the dimension of the air layer 34 in the vertical direction, in accordance with the transmission/reception frequency of the radiating element 15. Since the feeding element 31 and the radiating element 15 need not to be directly connected to each other, a process of welding the feeding element 31 and the radiating element 15 to each other is not required. Thus, the feeding element 31 and the radiating element 15 can be assembled to the ground conductor plate 10 with improved workability.

Figure 5:
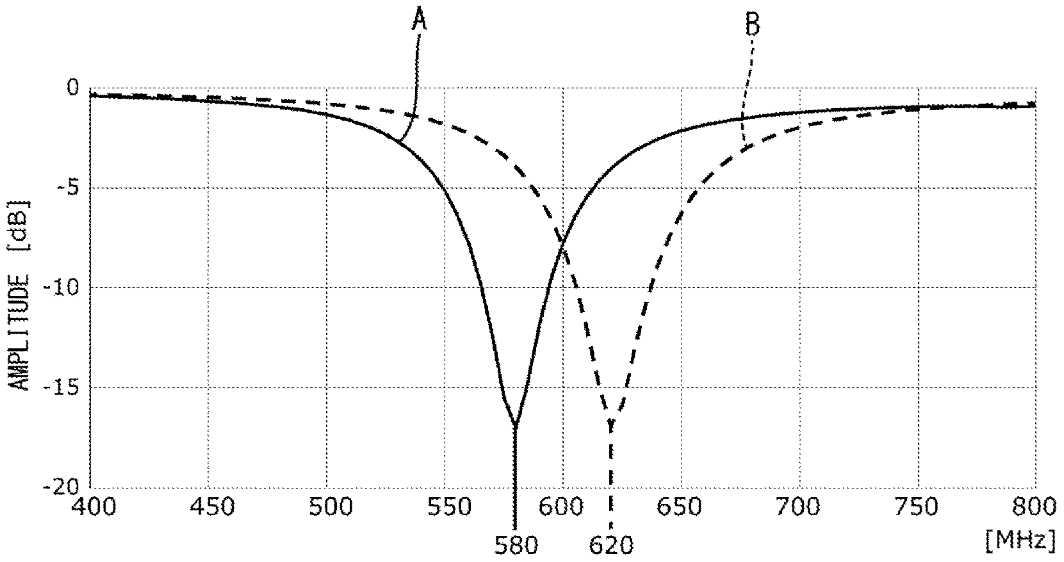
FIG. 5 is a graph illustrating a resonance frequency in a case where power is supplied to a radiating element using a feeding element, and a resonance frequency in a case where power is supplied to the radiating element to which a feeding line is directly connected without using the feeding element.

A graph in FIG. 5 illustrates reflection characteristics A of the antenna device (hereinafter, referred to as "embodiment device") in which power is supplied to the radiating element in a contactless manner using the feeding element as in the present first embodiment, and reflection characteristics B of an antenna device (hereinafter, referred to as "comparative device") in which power is directly supplied to the radiating element to which the feeding line is directly connected without using the feeding element. The ground conductor plate made of a square metal plate material with a length of one side being 750 mm is used in both the embodiment device and the comparative device. The radiating element made of a square metal plate material with a length of one side being 210 mm is used in both the embodiment device and the comparative device. The height from the ground conductor plate to the radiating element is the same between the embodiment device and the comparative device, and is 20 mm. In the embodiment device, there is a 2-mm gap between the facing plate portion of the feeding element and the radiating element.

The reflection characteristics of the embodiment device and the comparative device having different feeding modes was simulated under the conditions described above. As a result, the resonance frequency of the comparative device was found to be 620 MHz, whereas the resonance frequency of the embodiment device was found to be 580 MHz. Thus, the resonance frequency of the embodiment device was lower than that of the comparative device by about 6.5%. The smaller the area of the radiating element, the higher the resonance frequency. Thus, when designing the antenna devices with the same resonance frequency, the radiating element can be made smaller in a case where the feeding mode of the embodiment device is employed, as compared with the case of the comparative device.

The feeding line 35 is routed in a space below the ground conductor plate 10, that is, in a space on a side not provided with the feeding element 31 and the radiating element 15. The connector 36 forming an end portion of the feeding line 35 is attached to the ground conductor plate 10 in a penetrating manner. Compared with a case where the feeding line 35 is routed while being contained between the ground conductor plate 10 and the radiating element 15, a degree of design freedom in setting the routing path of the feeding line 35 is high in the antenna device of the present first embodiment.

The antenna device of the present first embodiment includes one positioning member 20 with which the radiating element 15 and the facing plate portion 32 are positioned. With the positioning member 20, the radiating element 15 and the facing plate portion 32 can face each other with stable distance and orientation. Thus, the optimum antenna characteristics can be maintained. Since the positioning member 20 and the feeding line 35 are fixed to the ground conductor plate 10, the feeding element 31 and the conductor 51 can be stably connected to each other.

The positioning member 20 is disposed between the ground conductor plate 10 and the radiating element 15 to function as a spacer. The containing recess portion 23 that contains the feeding element 31 is formed in the positioning member 20. The feeding element 31 is contained in the containing recess portion 23, and thereby protected from interference by a foreign matter.

The facing plate portion 32 has a circular plate shape, and the feeding element 31 including the facing plate portion 32 also has a circular shape as a whole. The facing plate portion 32 is coaxially attached to the inner conductor 37 of the conductor 51. When the feeding element 31 and the conductor 51 are assembled, even if the feeding element 31 (facing plate portion 32) is displaced relative to the conductor 51 in the circumferential direction, the antenna characteristics will not be affected.

Other Embodiments

The present disclosure is not limited to the embodiment described with the description above and the drawings, but is defined by claims. The present disclosure includes meanings equivalent to the scope of claims as well as any modification made without departing from the scope of claims, and is intended to include the following embodiments.

In the embodiment described above, the feeding line 35 is disposed penetrating the ground conductor plate 10. Alternatively, the feeding line 35 may be contained in a space between the ground conductor plate 10 and the radiating element 15, and disposed so as to extend along the ground conductor plate 10.

In the embodiment described above, positioning of the radiating element 15 and the facing plate portion 32 is implemented by one positioning member 20. Alternatively, the positioning of the radiating element 15 with respect to the ground conductor plate 10 and the positioning of the facing plate portion 32 with respect to the ground conductor plate 10 may be implemented using different positioning members.

In the embodiment described above, the positioning member 20 also functions as the dielectric substrate disposed between the ground conductor plate 10 and the radiating element 15. Alternatively, the positioning member 20 and the dielectric substrate may be different dedicated members.

In the embodiment described above, the positioning member 20 is fixed to the ground conductor plate 10. Alternatively, the positioning member 20 may be attached to a member or a portion different from the ground conductor plate 10.

In the embodiment described above, the connection portion 33 between the feeding element 31 and the conductor 51 is disposed in a space between the facing plate portion 32 and the ground conductor plate 10. Alternatively, the connection portion 33 may be disposed between the facing plate portion 32 and the radiating element 15.

In the embodiment described above, the facing plate portion 32 faces the radiating element 15 while being parallel thereto. Alternatively, the facing plate portion 32 may face the radiating element 15 in an inclined posture.

In the first embodiment described above, the air layer 34 serves as the dielectric layer interposed between the facing plate portion 32 and the radiating element 15. Alternatively, a solid matter including synthetic resin or the like may serve as the dielectric layer interposed between the facing plate portion 32 and the radiating element 15.

In the embodiment described above, the facing plate portion 32 has a flat plate shape. However, the facing plate portion 32 is not limited to the flat plate shape, and may have a conical shape.

In the embodiment described above, the feeding element 31 is contained in the containing recess portion 23. Alternatively, the feeding element 31 may be disposed while protruding from the outer surface of the positioning member 20.

In the embodiment described above, the connection portion 33 is arranged to be concentric with the circular facing plate portion 32. Alternatively, the connection portion 33 may be disposed at a position to be eccentric relative to the circular facing plate portion 32. In this case, the facing plate portion 32 and the conductor 51 are attached in an eccentric positional relationship.

In the embodiment described above, the facing plate portion 32 has a circular shape. Alternatively, the facing plate portion 32 may have non-circular shape such as a rectangular shape, a trapezoidal shape, an elliptical shape, or an oval shape.

In the embodiment described above, the radiating element 15 has a square outer circumference shape. Alternatively, the outer circumference shape of the radiating element 15 may be a polygonal shape other than square such as a rectangular shape, a trapezoidal shape, or a parallelogram shape, or may be a shape including a curved line such as a circular shape, an elliptical shape, or an oval shape.

In the embodiment described above, the radiating element 15 has a non-annular shape without a center hole. Alternatively, the radiating element 15 may have an annular shape with a center hole.

In the embodiment described above, the positioning member 20 has a square outer circumference shape. Alternatively, the outer circumference shape of the positioning member 20 may be a polygonal shape other than square such as a rectangular shape, a trapezoidal shape, or a parallelogram shape, or may be a shape including a curved line such as a circular shape, an elliptical shape, or an oval shape.

In the embodiment described above, the positioning member 20 has a non-annular shape without a center hole. Alternatively, the positioning member 20 may have an annular shape with a center hole.

In the embodiment described above, the radiating element 15 and the positioning member 20 have the same shape and size in plan view. Alternatively, the radiating element 15 and the positioning member 20 may have different shapes and sizes in plan view.

The invention claimed is:

1. An antenna device comprising:

a conductive ground conductor plate;

a plate-shaped radiating element disposed without being in contact with the ground conductor plate;

a feeding line including a conductor and a shield member that surrounds the conductor, the shield member being connected to the ground conductor plate;

a conductive feeding element that includes a facing plate portion that faces the radiating element with a dielectric layer provided therebetween, and is connected to the conductor;

a positioning member with which the radiating element and the facing plate portion are positioned;

a first positioning surface formed in the positioning member, the radiating element being fixed to the first positioning surface while being in surface contact with the first positioning surface; and a front surface recess portion formed in the positioning member and being a recess formed in a part of the first positioning surface, wherein the facing plate portion is contained in the front surface recess portion.

2. The antenna device according to claim 1, wherein the feeding line is attached penetrating the ground conductor plate.

3. The antenna device according to claim 2, wherein the facing plate portion has a circular shape, and the facing plate portion is coaxially attached to the conductor.

4. The antenna device according to claim 1, wherein the facing plate portion has a circular shape, and the facing plate portion is coaxially attached to the conductor.

5. An antenna device comprising:

a conductive ground conductor plate;

a plate-shaped radiating element disposed without being in contact with the ground conductor plate;

a feeding line including a conductor and a shield member that surrounds the conductor, the shield member being connected to the ground conductor plate;

a conductive feeding element that includes a facing plate portion that faces the radiating element with a dielectric layer provided in between, and is connected to the conductor;

a positioning member with which the radiating element and the facing plate portion are positioned; and a containing recess portion formed in the positioning member and containing the feeding element, wherein the containing recess portion includes a front surface recess portion opened to an outer circumference surface of the positioning member and an outer side surface recess portion opened in the outer circumference surface of the positioning member, the front surface recess portion and the outer side surface recess portion communicate with each other, the facing plate portion is contained in the front surface recess portion, and the conductor is contained in the outer side surface recess portion.

6. The antenna device according to claim 5, wherein the positioning member and the feeding line are fixed to the ground conductor plate.

7. The antenna device according to claim 6, wherein the facing plate portion has a circular shape, and the facing plate portion is coaxially attached to the conductor.

8. The antenna device according to claim 5, wherein the facing plate portion has a circular shape, and the facing plate portion is coaxially attached to the conductor.

* * * * *